United States Patent
Asanin et al.

(10) Patent No.: US 11,929,518 B2
(45) Date of Patent: Mar. 12, 2024

(54) TRACTION BATTERY FOR A MOTOR VEHICLE, MOTOR VEHICLE, AND METHOD FOR CONTROLLING DEGASSING ELEMENTS OF A TRACTION BATTERY

(71) Applicant: Bayerische Motoren Werke Aktiengesellschaft, Munich (DE)

(72) Inventors: Savo Asanin, Munich (DE); Felix Laasch, Munich (DE); Alexander Mueller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/983,517

(22) Filed: Nov. 9, 2022

(65) Prior Publication Data
US 2023/0145674 A1  May 11, 2023

(30) Foreign Application Priority Data
Nov. 10, 2021 (DE) ............ 10 2021 129 192.5

(51) Int. Cl.
*H01M 50/375* (2021.01)
*B60L 50/64* (2019.01)
*H01M 10/48* (2006.01)
*H01M 50/209* (2021.01)
*H01M 50/249* (2021.01)

(52) U.S. Cl.
CPC ........... *H01M 50/375* (2021.01); *B60L 50/64* (2019.02); *H01M 10/486* (2013.01); *H01M 50/209* (2021.01); *H01M 50/249* (2021.01); *H01M 2220/20* (2013.01)

(58) Field of Classification Search
CPC .................................................. H01M 50/375
See application file for complete search history.

(56) References Cited

U.S. PATENT DOCUMENTS

2009/0291334 A1* 11/2009 Brandon, II ...... H01M 8/04089
                                                             700/283
2012/0263982 A1* 10/2012 Yasui ................. H01M 10/058
                                                              429/61
(Continued)

FOREIGN PATENT DOCUMENTS

DE   10 2019 216 608 A1    4/2021
KR      20220137208 A   *  4/2021

OTHER PUBLICATIONS

German-language Search Report issued in German Application No. 10 2021 129 192.5 dated May 2, 2022 with partial English translation (10 pages).

*Primary Examiner* — Maria Laios
*Assistant Examiner* — Jordan E Berresford
(74) *Attorney, Agent, or Firm* — Crowell & Moring LLP

(57) ABSTRACT

A traction battery for a motor vehicle includes a plurality of battery cells which are electrically connected to one another, a battery housing which houses the battery cells, several degassing elements for conducting gas away out of the battery housing in the case of a cell outgassing, a sensing system for localizing the cell outgassing, and a control unit which, in the case of a cell outgassing, actuates the degassing elements such that the degassing element situated nearest the cell outgassing remains closed and one or more of the degassing elements that are farther away from the cell outgassing is/are opened.

10 Claims, 1 Drawing Sheet

(56) References Cited

U.S. PATENT DOCUMENTS

2019/0351268 A1    11/2019  Lee
2021/0288378 A1     9/2021  Okada et al.
2022/0037737 A1*    2/2022  Czech ................. H01M 50/204

* cited by examiner

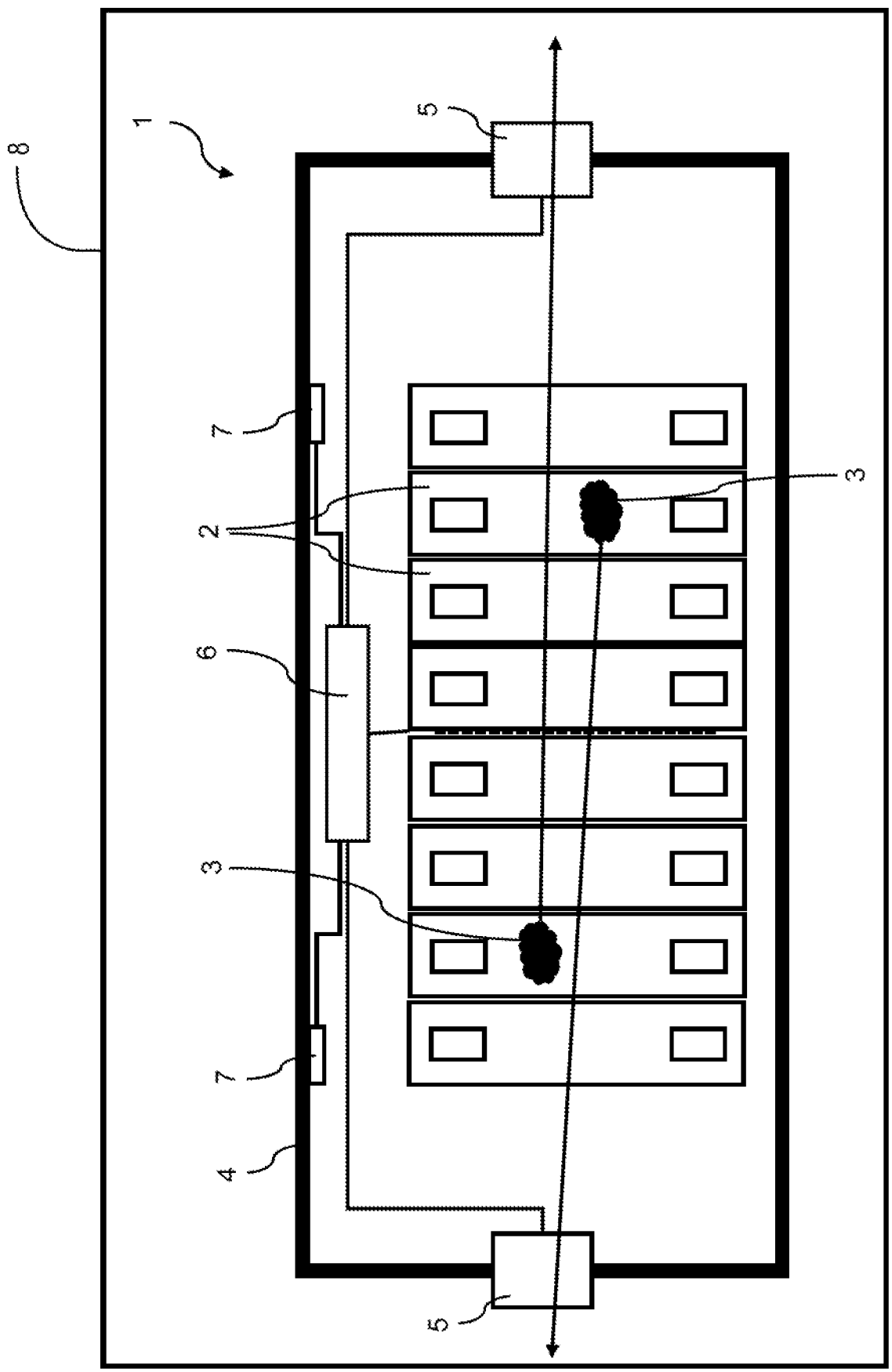

TRACTION BATTERY FOR A MOTOR VEHICLE, MOTOR VEHICLE, AND METHOD FOR CONTROLLING DEGASSING ELEMENTS OF A TRACTION BATTERY

CROSS REFERENCE TO RELATED APPLICATION

This application claims priority under 35 U.S.C. § 119 from German Patent Application No. DE 10 2021 129 192.5, filed Nov. 10, 2021, the entire disclosure of which is herein expressly incorporated by reference.

BACKGROUND AND SUMMARY OF THE INVENTION

The invention relates to a traction battery with degassing elements which in the case of a cell outgassing are to be opened for the purpose of conducting the hot gases away, in order to conduct the stream of gas away out of the battery housing. In addition, the invention relates to a motor vehicle with such a traction battery, and also to a method for controlling the degassing elements in the case of a cell outgassing.

In case of a fault—for instance, a short circuit in a battery cell—there is the possibility that a battery cell will undergo thermal runaway. In this case, the battery cell may outgas, or emit gas—that is to say, hot gases emerge from the battery cell in question. In traction batteries, a plurality of battery cells are accommodated in a battery housing which separates the battery cells from the environment. In the event of a runaway of a battery cell, the hot stream of gas arising has to be conducted away to the outside (out of the battery housing), in order to prevent an uncontrolled rupturing of the battery housing or damage to further battery cells. For this purpose, degassing elements are known in the form of excess-pressure valves, bursting membranes or such like, which are integrated in various forms and numbers in the wall of the battery housing. In this connection, attention would have to be paid to ensuring that the hot streams of gas do not result in damage outside the battery housing by reason of excessive temperature when flowing out.

It is therefore an object of the present invention to obtain an improvement when routing gases away in the case of an outgassing of battery cells. This object is achieved by a traction battery, by a motor vehicle and also by a method according to the claimed invention.

According to one embodiment of the invention, a traction battery for a motor vehicle is provided, having a plurality of battery cells which are electrically connected to one another, having a battery housing which houses the battery cells, having several degassing elements for conducting gas away out of the battery housing in the case of a cell outgassing, having a sensing system for localizing the cell outgassing, having a control unit which in the case of a cell outgassing actuates the degassing elements in such a manner that the degassing element situated nearest the cell outgassing remains closed and one or more of the degassing elements that are farther away from the cell outgassing is/are opened. As a result, the stream of gas within the battery housing has to travel a certain distance before the stream of gas can escape to the environment. In this way, the interior of the battery housing serves as cooling path for the hot stream of gas, in turn lowering the risk of the stream of gas being too hot when it exits the battery housing.

According to a further embodiment of the invention, at least the degassing element that, of all the degassing elements in the battery housing in the case of outgassing, is farthest away from the cell outgassing is opened by the control unit. As a result, the cooling path within the battery housing is maximized, and the stream of gas is cooled as much as possible.

According to a further embodiment of the invention, the sensing system includes several temperature sensors.

According to a further embodiment of the invention, the sensing system includes a voltage-monitoring device with which a drop in voltage at one or more battery cells is capable of being detected, in order consequently to detect a cell outgassing.

According to a further embodiment of the invention, the sensing system includes an optical capture device.

In addition, the present invention provides a motor vehicle having such a traction battery.

Furthermore, the present invention provides a method for controlling degassing elements for conducting gas away out of a battery housing of a traction battery for a motor vehicle, with the following steps: identifying a cell outgassing, localizing the cell outgassing by way of a sensing system, actuating the degassing elements in such a manner in the case of a cell outgassing that the degassing element situated nearest the cell outgassing remains closed and one or more of the degassing elements that are farther away from the cell outgassing is/are opened. As already mentioned above, as a result the interior of the battery housing acts as cooling path.

According to a further embodiment of the method, at least the degassing element that, of all the degassing elements in the battery housing in the case of outgassing, is farthest away from the cell outgassing is opened by the control unit. As already mentioned, as a result the cooling path is maximized.

According to a further embodiment, the method further features the step of localizing the cell outgassing using temperature sensors.

According to a further embodiment, the method further features the step of localizing the cell outgassing using a voltage-monitoring device with which a drop in voltage at one or more battery cells is registered, in order to infer a cell outgassing therefrom.

In the following, a preferred embodiment of the present invention will be described with reference to the drawing.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows schematically a traction battery 1 according to an embodiment of the invention.

DETAILED DESCRIPTION OF THE DRAWING

The traction battery 1 has been installed in a motor vehicle 8. The motor vehicle 8 is an electrified motor vehicle which, at least at times, is propelled purely electrically. In particular, it may be a passenger car.

The traction battery 1 includes a plurality of battery cells 2 which are electrically connected to one another. For instance, the battery cells 2 may have been electrically connected in series and/or in parallel. The battery cells 2 are electrochemically-based cells for storing and providing electrical energy at least for the drive of the motor vehicle 8—that is to say, for supplying one or more drive motors.

The battery cells 2 may be cylindrical cells or (as shown by way of example) rectangular-cuboid cells. In case of a fault, particularly in the event of a thermal runaway of the battery cell 2, a battery cell 2 might outgas—that is to say, hot gases might emerge from the battery cell, that is to say, a cell outgassing 3 is present.

The battery cells 2 are housed in a battery housing 4 which separates the battery cells 2 from the environment of the battery housing 4 in a fluid-tight manner or hermetically.

Degassing elements 5 (at least two, for instance also three, four or more) are arranged in or on one or more walls of the battery housing 4. In normal operation—that is to say, when a cell outgassing 3 of a battery cell 2 is not present—the degassing elements 5 are closed in fluid-tight manner. In the case of a cell outgassing 3 of at least one battery cell 2, at least one of the degassing elements 5 is opened, so that the hot gases emerging from the outgassing battery cell 2 can escape from the battery housing 4 to the environment via the opened degassing element(s) 5—that is to say, outside the battery housing 4—in particular to a region surrounding the motor vehicle 8. The degassing elements 5 are valves, flaps or such like which are capable of being actuated.

In addition, the traction battery 1 includes a control unit 6 which has been adapted to actuate the degassing elements 5. The control unit 6 may have been arranged in, on or outside the battery housing 4.

Furthermore, a sensing system 7 is provided which communicates detection signals to the control unit 6. The control unit 6 may have been connected to the degassing elements 5 and to the sensing system 7 via wires, cables, or in wireless manner. The sensing system 7 may include several temperature sensors, pressure sensors and/or temperature/pressure sensors spaced from one another. In FIG. 1, temperature sensors are indicated as an example of the sensing system 7. Additionally or alternatively, the sensing system 7 may include a voltage-monitoring device which monitors a voltage of the individual battery cells 2 and, in the event of a drop in voltage occurring, determines that a cell outgassing 3 of a particular battery cell 2 is present, and can infer the position of the cell outgassing 3 with the aid of stored positions of the individual battery cells 2. In addition, the sensing system 7 may include an optical capture device, for example an optical camera or a thermal-imaging camera, by way of which a cell outgassing 3 is capable of being identified and localized.

In the case of a detected cell outgassing 3 and the localization of the cell outgassing 3, the control unit 6 controls the degassing elements 5 in such a manner that at least the degassing element 5 that has the shortest spacing from the cell outgassing 3 remains closed. The degassing elements 5 are to be configured structurally in such a way that they are not opened unintentionally even by a pressure surge possibly arising as a result of the cell outgassing 3. Of the remaining degassing elements 5, one or more is/are opened. At least a single degassing element 5 is opened, specifically that one which has the largest spacing from the cell outgassing 3.

As a result, the stream of gas within the battery housing 4 has to travel a certain distance before the stream of gas escapes to the environment, so the interior of the battery housing serves as cooling path for the hot stream of gas.

Whilst the invention has been illustrated and described in detail in the drawing and in the foregoing description, this illustration and description is to be understood as being exemplary and not restrictive, and it is not the intention to restrict the invention to the disclosed embodiment. The mere fact that certain features have been mentioned in various dependent claims is not intended to suggest that a combination of these features might not also be utilized advantageously.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A traction battery for a motor vehicle, the traction battery comprising:
   a plurality of battery cells which are electrically connected to one another;
   a battery housing which houses the plurality of battery cells;
   a plurality of degassing elements that are configured to conduct gas out of the battery housing in a case of a cell outgassing;
   a sensing system that, in the case of the cell outgassing, is configured to localize the cell outgassing and to send detection signals to a control unit; and
   the control unit which, in the case of the cell outgassing, is configured to receive the detection signals from the sensing system and to send control signals to actuate the degassing elements such that a first degassing element situated nearest the cell outgassing remains closed and one or more other degassing elements that are farther away from the cell outgassing are opened.

2. The traction battery according to claim 1, wherein at least a second degassing element that, of all the degassing elements in the battery housing in the case of the cell outgassing, is farthest away from the cell outgassing, is opened by the control unit.

3. The traction battery according to claim 1, wherein the sensing system comprises a plurality of temperature sensors.

4. The traction battery according to claim 1, wherein the sensing system comprises a voltage-monitoring device with which a drop in voltage at one or more of the battery cells is detectable, in order to detect the cell outgassing.

5. The traction battery according to claim 1, wherein the sensing system comprises an optical capture device.

6. A motor vehicle comprising the traction battery according to claim 1.

7. A method for controlling degassing elements for conducting gas out of a battery housing of a traction battery for a motor vehicle, the method comprising:
   identifying a cell outgassing;
   localizing the cell outgassing by a sensing system;
   sending, by the sensing system, detection signals to a control unit;
   receiving, by the control unit, the detection signals from the sensing system; and
   sending, by the control unit, control signals to actuate the degassing elements such that a first degassing element situated nearest the cell outgassing remains closed and one or more other degassing elements that are farther away from the cell outgassing are opened.

8. The method according to claim 7, wherein at least a second degassing element that, of all the degassing elements in the battery housing in the case of the cell outgassing, is farthest away from the cell outgassing, is opened by the control unit.

9. The method according to claim 7, wherein localizing the cell outgassing comprises using temperature sensors.

10. The method according to claim 7, wherein localizing the cell outgassing comprises using a voltage-monitoring device with which a drop in voltage at one or more of the battery cells is registered, in order to detect the cell outgassing.

* * * * *